(12) United States Patent
Sirous

(10) Patent No.: US 10,056,817 B2
(45) Date of Patent: Aug. 21, 2018

(54) FLUID FERFEREH

(71) Applicant: Saeid Sirous, Najaf abad (IR)

(72) Inventor: Saeid Sirous, Najaf abad (IR)

( * ) Notice: Subject to any disclaimer, the term of this patent is extended or adjusted under 35 U.S.C. 154(b) by 339 days.

(21) Appl. No.: 14/537,110

(22) Filed: Nov. 10, 2014

(65) Prior Publication Data

US 2016/0172955 A1 Jun. 16, 2016

Related U.S. Application Data

(63) Continuation of application No. 14/085,843, filed on Nov. 21, 2013.

(51) Int. Cl.
*H02K 44/08* (2006.01)
*F01L 1/32* (2006.01)
*F02C 3/16* (2006.01)

(52) U.S. Cl.
CPC ............. *H02K 44/085* (2013.01); *F01L 1/32* (2013.01); *F02C 3/16* (2013.01); *Y02E 20/16* (2013.01)

(58) Field of Classification Search
CPC .... H02K 44/085; H02K 44/00; F04D 29/053; F04D 29/056; F04D 29/063; F04D 29/324; F04D 29/522; F04D 29/542; F04D 29/582; F01L 1/32; F02C 3/165; F03B 13/00
See application file for complete search history.

(56) References Cited

U.S. PATENT DOCUMENTS

| | | | | |
|---|---|---|---|---|
| 3,801,326 A * | 4/1974 | Claes | ...................... | B01F 3/088 430/569 |
| 4,455,121 A * | 6/1984 | Jen | ........................... | F01D 9/00 415/143 |
| 4,935,650 A * | 6/1990 | Hannan, III | ........... | H02K 44/04 290/52 |
| 5,317,905 A * | 6/1994 | Johnson | ..................... | F01D 1/32 416/120 |
| 5,560,196 A * | 10/1996 | Schlote | ...................... | F01D 1/32 60/39.35 |
| 6,116,851 A * | 9/2000 | Oklejas, Jr. | ............... | F01D 1/12 415/57.3 |
| 6,668,539 B2 * | 12/2003 | Schlote | ...................... | F01D 1/32 415/80 |
| 6,997,674 B1 * | 2/2006 | Johnson | ..................... | F01D 1/32 415/104 |
| 7,866,937 B2 * | 1/2011 | Schlote | ...................... | F04D 1/00 415/1 |
| 8,621,867 B2 * | 1/2014 | Galbraith | .................. | F03G 6/00 60/517 |
| 8,771,499 B2 * | 7/2014 | McCutchen | ......... | B01D 9/0022 205/742 |
| 2009/0102194 A1 * | 4/2009 | M' Ariza Garcia San Miguel | | ............................... F03D 3/061 290/44 |

(Continued)

OTHER PUBLICATIONS

16th Annual Independent Inventors Conference; Aug. 15-16, 2014; USPTO, Alexandria VA; Advanced Claim Drafting.*

*Primary Examiner* — Michael C Zarroli

(57) ABSTRACT

In this device, the nozzles that often used in order to make a linear motion, so they can be helpful in rotating the disc if they are placed at the external ring of disc. In addition, in this case, apart from generating electricity from the discharging fluid of the nozzle by ionization method, the kinetic energy of the discharging fluid can be used for rotating the disc as well.

6 Claims, 15 Drawing Sheets

(56) References Cited

U.S. PATENT DOCUMENTS

| | | | |
|---|---|---|---|
| 2012/0003091 A1* | 1/2012 | Segovia | F01D 5/082 416/95 |
| 2015/0068206 A1* | 3/2015 | Sverdlin | F01K 27/00 60/643 |
| 2016/0290223 A1* | 10/2016 | Mills | C01B 3/00 |

* cited by examiner

FLUID FERFEREH

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

1) U.S. Patent Classification 415/80, 310/11
2) The Reaction Principle

A fixed nozzle, a rocket, a whirling lawn sprinkler are devices that cause a fluid to exit at high speeds. The fluid, beginning with zero velocity inside, creates a force in the direction of motion F equal to $$F=\dot{m}V$$

And there is a corresponding and equal force tending to move the devices in the opposite direction. This force is called reaction. The devices mentioned above are, therefore, reaction machines that may have to hold stationary (the nozzle), move in a straight line (the rocket), or in a rotary fashion (the sprinkler). In all these, the pressure drop (caused by enthalpy drop) that causes the high velocities occur inside the devices.

3) Impulse Turbines

Impulse turbines or turbine stages are simple, single-rotor or multi rotor (compounded) turbines to which impulse blades are attached. Impulse blades can be recognized by their shape. They are usually symmetrical and have entrance and exit angles, F and γ respectively, around 20°. Because they are usually used in the entrance high-pressure stages of a turbine, when the specific volume of fluid is low and requires much smaller flow areas than at lower pressures, the impulse blades are short and have constant cross sections.

In the impulse turbine, no pressure drop (except that caused by friction) occurs in the moving blades. Impulse turbines are also characterized by the fact that most or all of the enthalpy, and hence the pressure, drop occurs in the nozzles (or fixed blades that act as nozzles) and little or none in the moving blades. What pressure drop occurs in the moving blade is a result of friction.

4) Reaction Turbines

Reaction turbines, originally invented by C. A. Parsons, are illustrated by FIG. 1 with three stages, each composed of a row of fixed blades and a row of moving blades. The stationary blades are designed in such a fashion that the passages between them form the flow areas of nozzles. They are therefore nozzles with full steam admission around the rotor periphery.

The moving blades of a reaction turbine are easily distinguishable from those of an impulse turbine in that they are not symmetrical and, because they act partly as nozzles, have a shape similar to that of the fixed blades, although curved in the opposite direction. The schematic pressure line (FIG. 1) shows that pressure continually drops through all rows of blades, fixed and moving, though the pressure change is greater the pressure. The absolute fluid velocity changes within each stage as shown and repeats from stage to stage.

A reaction turbine, therefore, is one that is constructed of rows of fixed and rows of moving blades. The fixed blades act as nozzles. The moving blades move as a result of the impulse of fluid received (caused by change in momentum) and also as a result of expansion and acceleration of the fluid relative to them. In other words, they also act as nozzles. The enthalpy drop per stage of one row fixed and one row moving blades is divided among them, often equally. Thus a blade with a 50 percent degree of reaction, or a 50 percent reaction stage, is one in which half the enthalpy drop of the stage occurs in the fixed blades and half in the moving blades. The pressure drops will not be equal, however. They are greater for the fixed blades and greater for the high-pressure than the low-pressure stages, as explained for the pressure compounded impulse turbine.

The Components shown in FIG. 1 are:
1) Rotor blades
2) Stationary blades
5) Converging Diverging (CD) Nozzle The usual configuration for a converging diverging (CD) nozzle is shown in the FIG. 2. Gas flows through the nozzle from a region of high pressure (usually referred to as the chamber) to one of low pressure (referred to as the ambient or tank). The chamber is usually big enough so that any flow velocities here are negligible. The pressure here is denoted by the symbol $p_c$. Gas flows from the chamber into the converging portion of the nozzle, past the throat, through the diverging portion and then exhausts into the ambient as a jet. The pressure of the ambient is referred to as the 'back pressure' and given the symbol $p_b$.

To get a basic feel for the behavior of the nozzle imagine performing the simple experiment shown in FIG. 2. Here we use a converging diverging nozzle to connect two air cylinders. Cylinder A contains air at high pressure, and takes the place of the chamber. The CD nozzle exhausts this air into cylinder B, which takes the place of the tank.

Imagine you are controlling the pressure in cylinder B, and measuring the resulting mass flow rate through the nozzle. You may expect that the lower you make the pressure in B the more mass flow you'll get through the nozzle. This is true, but only up to a point. If you lower the back pressure enough you come to a place where the flow rate suddenly stops increasing all together and it doesn't matter how much lower you make the back pressure (even if you make it a vacuum) you can't get any more mass flow out of the nozzle. We say that the nozzle has become 'choked'. You could delay this behavior by making the nozzle throat bigger (e.g. grey line) but eventually the same thing would happen. The nozzle will become choked even if you eliminated the throat altogether and just had a converging nozzle.

The reason for this behavior has to do with the way the flows behave at Mach 1, i.e. when the flow speed reaches the speed of sound. In a steady internal flow (like a nozzle) the Mach number can only reach 1 at a minimum in the cross-sectional area. When the nozzle isn't choked, the flow through it is entirely subsonic and, if you lower the back pressure a little, the flow goes faster and the flow rate increases. As you lower the back pressure further the flow speed at the throat eventually reaches the speed of sound (Mach 1). Any further lowering of the back pressure can't accelerate the flow through the nozzle anymore, because that would entail moving the point where M=1 away from the throat where the area is a minimum, and so the flow gets stuck. The flow pattern downstream of the nozzle (in the diverging section and jet) can still change if you lower the back pressure further, but the mass flow rate is now fixed because the flow in the throat (and for that matter in the entire converging section) is now fixed too.

The changes in the flow pattern after the nozzle has become choked are not very important in our thought experiment because they don't change the mass flow rate. They are, however, very important however if you were using this nozzle to accelerate the flow out of a jet engine or rocket and create propulsion, or if you just want to understand how high-speed flows work.

FIG. 2a shows the flow through the nozzle when it is completely subsonic (i.e. the nozzle isn't choked). The flow accelerates out of the chamber through the converging section, reaching its maximum (subsonic) speed at the throat. The flow then decelerates through the diverging section and exhausts into the ambient as a subsonic jet. Lowering the back pressure in this state increases the flow speed everywhere in the nozzle.

Lower it far enough and we eventually get to the situation shown in FIG. 2b. The flow pattern is exactly the same as in subsonic flow, except that the flow speed at the throat has just reached Mach 1. Flow through the nozzle is now choked since further reductions in the back pressure can't move the point of M=1 away from the throat. However, the flow pattern in the diverging section does change as you lower the back pressure further.

As $p_b$ is lowered below that needed to just choke the flow a region of supersonic flow forms just downstream of the throat. Unlike a subsonic flow, the supersonic flow accelerates as the area gets bigger. This region of supersonic acceleration is terminated by a normal shock wave. The shock wave produces a near-instantaneous deceleration of the flow to subsonic speed. This subsonic flow then decelerates through the remainder of the diverging section and exhausts as a subsonic jet. In this regime if you lower or raise the back pressure you increase or decrease the length of supersonic flow in the diverging section before the shock wave.

If you lower $p_b$ enough you can extend the supersonic region all the way down the nozzle until the shock is sitting at the nozzle exit (FIG. 2d). Because you have a very long region of acceleration (the entire nozzle length) in this case, the flow speed just before the shock will be very large. However, after the shock the flow in the jet will still be subsonic.

Lowering the back pressure further causes the shock to bend out into the jet (FIG. 2e), and a complex pattern of shocks and reflections is set up in the jet which will now involve a mixture of subsonic and supersonic flow, or (if the back pressure is low enough) just supersonic flow. Because the shock is no longer perpendicular to the flow near the nozzle walls, it deflects it inward as it leaves the exit producing an initially contracting jet. We refer to this as over expanded flow because in this case the pressure at the nozzle exit is lower than that in the ambient (the back pressure)—i.e. the flow has been expanded by the nozzle too much.

A further lowering of the back pressure changes and weakens the wave pattern in the jet. Eventually we will have lowered the back pressure enough so that it is now equal to the pressure at the nozzle exit. In this case, the waves in the jet disappear altogether (FIG. 2f), and the jet will be uniformly supersonic. This situation, since it is often desirable, is referred to as the 'design condition'.

Finally, if we lower the back pressure even further we will create a new imbalance between the exit and back pressures (exit pressure greater than back pressure), FIG. 2g. In this situation (called 'under expanded') what we call expansion waves (that produce gradual turning and acceleration in the jet) form at the nozzle exit, initially turning the flow at the jet edges outward in a plume and setting up a different type of complex wave pattern.

The Pressure Distribution in the Nozzle

A plot of the pressure distribution along the nozzle (FIG. 2) provides a good way of summarizing its behavior. To understand how the pressure behaves you have to remember only a few basic rules When the flow accelerates (sub or supersonically) the pressure drops The pressure rises instantaneously across a shock The pressure throughout the jet is always the same as the ambient (i.e. the back pressure) unless the jet is supersonic and there are shocks or expansion waves in the jet to produce pressure differences.

The pressure falls across an expansion wave.

The labels on FIG. 2 indicate the back pressure and pressure distribution for each of the flow regimes illustrated in FIG. 2. Notice how, once the flow is choked, the pressure distribution in the converging section doesn't change with the back pressure at all. The Components shown in FIG. 2 are:

3) Throat of nozzle
4) Outlet of nozzle
6) Centrifugal compressors

Centrifugal compressors, sometimes termed radial compressors, are a subclass of dynamic axisymmetric work-absorbing turbomachinery.

The idealized compressive dynamic turbo-machine achieves a pressure rise by adding kinetic energy/velocity to a continuous flow of fluid through the rotor or impeller. This kinetic energy is then converted to an increase in potential energy/static pressure by slowing the flow through a diffuser. The pressure rise in impeller is in most cases almost equal to the rise in the diffuser section.

Theory of Operation

Imagine a simple case where flow passes through a straight pipe to enter a centrifugal compressor. The simple flow is straight, uniform and has no vorticity. As illustrated below α1=0 deg. As the flow continues to pass into and through the centrifugal impeller, the impeller forces the flow to spin faster and faster. According to a form of Euler's fluid dynamics equation, known as "pump and turbine equation," the energy input to the fluid is proportional to the flow's local spinning velocity multiplied by the local impeller tangential velocity.

In many cases the flow leaving centrifugal impeller is near the speed of sound (340 meters/second). The flow then typically flows through a stationary compressor causing it to decelerate. These stationary compressors are actually static guide vanes where energy transformation takes place. As described in Bernoulli's principle, this reduction in velocity causes the pressure to raise leading to a compressed fluid.

Components of a Simple Centrifugal Compressor

A simple centrifugal compressor has four components: inlet, impeller/rotor, diffuser, and collector.

Inlet

The inlet to a centrifugal compressor is typically a simple pipe. It may include features such as a valve, stationary vanes/airfoils (used to help swirl the flow) and both pressure and temperature instrumentation. All of these additional devices have important uses in the control of the centrifugal compressor.

Centrifugal Impeller

The key component that makes a compressor centrifugal is the centrifugal impeller. It is the impeller's rotating set of vanes (or blades) that gradually raises the energy of the working gas. This is identical to an axial compressor with the exception that the gases can reach higher velocities and energy levels through the impeller's increasing radius. In many modern high-efficiency centrifugal compressors the gas exiting the impeller is traveling near the speed of sound.

Impellers are designed in many configurations including "open" (visible blades), "covered or shrouded", "with splitters" (every other inducer removed) and "w/o splitters" (all full blades). Most modern high efficiency impellers use "back sweep" in the blade shape.

Euler's pump and turbine equation plays an important role in understanding impeller performance.

Diffuser

The next key component to the simple centrifugal compressor is the diffuser. Downstream of the impeller in the flow path, it is the diffuser's responsibility to convert the kinetic energy (high velocity) of the gas into pressure by gradually slowing (diffusing) the gas velocity. Diffusers can be vane less, vanned or an alternating combination. High efficiency vanned diffusers are also designed over a wide range of solidities from less than 1 to over 4. Hybrid versions of vanned diffusers include: wedge, channel, and pipe diffusers. There are turbocharger applications that benefit by incorporating no diffuser.

Bernoulli's fluid dynamic principle plays an important role in understanding diffuser performance.

7) Electric Thrusters

Electric thrusters are known in the art. Unlike chemical propulsion, where the specific impulse is limited by the energy available when molecules combine, in electric propulsion energy is added from an external source. In principle, therefore, the specific impulse can be as large as desired. In practice, of course, the specific impulse is limited by the particular implementation used. Since thrust will decrease as the specific impulse increases for a given power, a tradeoff must be made for a particular mission between propellant usage and mission time. High specific impulse leads to low propellant usage.

The tradeoff between electric propulsion and chemical propulsion is high thrust, low specific impulse for chemical and low thrust, high specific impulse for electric. Electric thrusters cannot be used for launch because the thrust is too low. Electric thrusters can only be used in the vacuum of outer space.

There are three main types of electric thrusters:
Electrothermal
Electromagnetic
And Electrostatic.

Electrothermal thrusters are similar to standard chemical rocket engines. Electrical energy is added to the working gas, but the gas is expanded through a converging-diverging nozzle to achieve high exhaust speeds just as in chemical rockets. Some examples are the resistojet, the arc jet, and microwave heated thrusters. In the resistojet, gases already hot from burning are further heated electrically. The arc jet uses an electrical arc to create very high temperatures. More recently, microwaves have been proposed to do the heating of the gas in thrusters which are otherwise like arcjets. As a class, electrothermal thrusters are probably the most mature electric propulsion technology, although the individual thruster with the most operational experience is the Teflon ablative type. Resistojets have been used for many years, and arcjets have also been used over the past few years in operational, commercial communications satellites. Compared to other electric thrusters, electrothermal devices have higher thrusts, but lower specific impulse, in the range of 500-1000 seconds. They share with chemical rockets an optimization when the molecular weight of the exhaust gas is low, unlike other electric thrusters.

There are a variety of electromagnetic thruster configurations, but all depend on generating a thrust by accelerating particles in a direction perpendicular to both the current in the plasma and the magnetic field. The pulsed plasma micro thruster (PPJ) utilizes a spark discharge across a block of Teflon to create plasma which is accelerated outward by induced azimuthal current interacting with a radial magnetic field. In a Hall thruster an axial electric field provided in a radial magnetic field creates an azimuthal Hall current which accelerates plasma axially producing thrust. In the self-field magnetoplasmadynamic (MPD) thruster, the current flow creates its own magnetic field in which the j×B force accelerates the plasma flow radially and axially. This can only occur if the current and hence the power are high, necessitating pulsed operation at lower average powers.

Interestingly, the self-field MPD thruster is similar to the electrothermal arcjet. The MPD regime is reached when the mass flow is reduced.

In general, electromagnetic thrusters have much higher specific impulse than electrothermal thrusters do. They are more compact than electrostatic ion thrusters are because a charge neutral plasma does not have a space charge limitation on density. Problems include electrode erosion and general complexity of flow and current fields which make them somewhat difficult to predict. The PPf thruster is mature and simple, but harder to scale up to large powers.

Electrostatic ion thrusters use a set of grids to accelerate charged ions. Electrons are also expelled separately to maintain charge neutrality and prevent a charge buildup which could shut off the ion beam. Heavy gases are used; mercury was used in the initial versions and xenon is used today. This reduces ionization losses as a fraction of total energy. Ionization losses are approximately the same for most gases, whereas for a given exhaust velocity the energy added per ion is greater for heavier gases.

In electrostatic thrusters the beam consists of ions only and repulsion between particles limits the maximum density to relatively low levels. The electrostatic thruster offers significantly lower thrust than conventional RF plasma thrusters.

The prior use of RF plasma thrusters has suffered from poor efficiency due primarily to power loss through a bot electron population created by electron cyclotron resonance (ECR) beating of the plasma. The use of ECR has several disadvantages. The major disadvantage is the creation of a bot electron population that robs the thruster of power, leading to low efficiency. Other disadvantages include the ECR beating requires higher frequencies for a given set of plasma parameters than other RF beating schemes. Higher frequency RF sources are generally more expensive and less efficient. Additionally, the frequency and magnetic field must be precisely matched. Plasma densities are usually limited to less than the cutoff density for a given, frequency.

An ECR generated plasma contains populations of electrons with different temperatures. A hot population forms because of "runaway'. Electron drag and collision cross section decrease as electron energy increases. Once an electron reaches a critical energy, it "runs away" because the drag can no longer balance the RF energy absorbed. An electron in resonance with the RF field essentially sees a continuous DC field, as the field rotates at the same rate as the electron as it spirals around the magnetic field line. The electron energy increases until some other process limits the energy. The ultimate limit for magnetic mirror machines occurs when the electron energy is high enough that the adiabatic invariant is no longer conserved and electrons are no longer trapped in the mirror. Hot electrons are generally produced by using twice the fundamental frequency, which is more effective at heating hotter particles.

In most of these devices there are particular reasons for producing the hot electron population. Hot electrons take almost all their energy with them when they are hot because their energies are so much greater than the plasma potential They also tend to absorb more RF power than colder electrons. For a thruster, all the power entering the warm or hot electrons is simply wasted. All ECR plasmas on which there were diagnostics capable of observing bot electrons have shown split electron populations. Power balance calculations show that about 1% of the RF power was going into the cold plasma in the ECR plasma and somewhere between 50% and 100% of the RF went into the cold plasma in the lower hybrid generated plasma. It would be desirable to have a RF plasma thruster which has high efficiency, utilizes lower frequency RF sources than ECR beating, and does not suffer from hot electron runaway.

RF plasma thrusters are also simpler than electromagnetic thrusters, which generally have currents perpendicular to the magnetic field, which crossed with the magnetic field produces the thrust. The currents produce their own magnetic field, which in the worst case can go unstable. In any case, the current produces its own magnetic field which interacts with the imposed magnetic field. This makes scaling of devices to different sizes difficult. By contrast, in the RF plasma thruster each flux tube is like any other. The rapid axial transport of particles compared to radial movements means there is little interaction between flux tubes, so scaling up (or down) in size is very predictable.

It would be desirable to have a RF plasma thruster that does not suffer from poor efficiency while providing a high specific impulse, high power density and is adaptable to many different applications.

8) Magnetohydrodynamic Generator

The MHD (magnetohydrodynamic) generator transforms thermal energy and kinetic energy directly into electricity. MHD generators are different from traditional electric generators in that they operate at high temperatures without moving parts. MHD was developed because the hot exhaust gas of an MHD generator can heat the boilers of a steam power plant, increasing overall efficiency. MHD was developed as a topping cycle to increase the efficiency of electric generation, especially when burning coal or natural gas. MHD dynamos are the complement of MHD propulsions, which have been applied to pump liquid metals and in several experimental ship engines. Components shown in FIG. 3 are:

3) Throat of nozzle
4) Outlet of nozzle
5) Segmented electrodes
6) Solenoids
8) Inlet of nozzle An MHD generator, like a conventional generator, relies on moving a conductor through a magnetic field to generate electric current. The MHD generator uses hot conductive plasma as the moving conductor. The mechanical dynamo, in contrast, uses the motion of mechanical devices to accomplish this. MHD generators are technically practical for fossil fuels, but have been overtaken by other, less expensive technologies, such as combined cycles in which a gas turbine's or molten carbonate fuel cell's exhaust heats steam to power a steam turbine.

Natural MHD dynamos are an active area of research in plasma physics and are of great interest to the geophysics and astrophysics communities, since the magnetic fields of the earth and sun are produced by these natural dynamos.

Principle

The Lorentz Force Law describes the effects of a charged particle moving in a constant magnetic field. The simplest form of this law is given by the vector equation.

$$F = Q \cdot (v \times B)$$

Where
F is the force acting on the particle.
Q is the charge of the particle,
v is the velocity of the particle, and
B is the magnetic field.
The vector F is perpendicular to both v and B according to the right hand rule.

The Plasma

The prime system requirement is creating and managing the conducting gas plasma since the system depends on the plasma having a high electrical conductivity. Suitable working fluids are gases derived from combustion, noble gases, and alkali metal vapors.

The Gas Plasma

To achieve high conductivity, the gas must be ionized, detaching the electrons from the atoms or molecules leaving positively charged ions of the gas. The plasma flows through the magnetic field at high speed, in some designs, more than the speed of sound, the flow of the charged particles providing the necessary moving electrical conductor.

Methods of Ionizing the Gas

Various methods for ionizing the gas are available, all of which depend on imparting sufficient energy to the gas. It may be accomplished by heating or irradiating the gas with X rays or Gamma rays. It has also been proposed to use the coolant gases such as helium and carbon dioxide employed in some nuclear reactors as the plasma fuel for direct MHD electricity generation rather than extracting the heat energy of the gas through heat exchangers to raise steam to drive turbine generators. Seed materials such as Potassium carbonate or Cesium are often added in small amounts, typically about 1% of the total mass flow to increase the ionization and improve the conductivity, particularly of combustion gas plasmas.

Containment

Since the plasma temperature is typically over 1000° C., the duct containing the plasma must be constructed from non-conducting materials capable of withstanding these high temperatures. The electrodes must of course be conducting as well as heat resistant.

Power Generation

Typically, for a large scale power station to approach the operational efficiency of computer models, steps must be taken to increase the electrical conductivity of the conductive substance. The heating of a gas to its plasma state or the addition of other easily ignitable substances like the salts of alkali metals can accomplish this increase. In practice, a number of issues must be considered in the implementation of an MHD generator: generator efficiency, economics, and toxic byproducts. These issues are affected by the choice of one of the three MHD generator designs: the Faraday generator, the Hall generator, and the disk generator.

8-1) Faraday Generator

The Faraday generator is named after the man who first looked for the effect in the Thames River. A simple Faraday generator would consist of a wedge-shaped pipe or tube of some non-conductive material. When an electrically conductive fluid flows through the tube, in the presence of a significant perpendicular magnetic field, a charge is induced in the field, which can be drawn off as electrical power by placing the electrodes on the sides at 90 degree angles to the magnetic field.

There are limitations on the density and type of field used. The amount of power that can be extracted is proportional to the cross sectional area of the tube and the speed of the conductive flow. The conductive substance is also cooled and slowed by this process. MHD generators typically reduce the temperature of the conductive substance from plasma temperatures to just over 1000° C.

The main practical problem of a Faraday generator is that differential voltages and currents in the fluid short through the electrodes on the sides of the duct. The most powerful waste is from the Hall effect current. This makes the Faraday duct very inefficient. Most further refinements of MHD generators have tried to solve this problem. The optimal magnetic field on duct-shaped MHD generators is a sort of saddle shape. To get this field, a large generator requires an extremely powerful magnet. Many research groups have tried to adapt superconducting magnets to this purpose, with varying success.

8-2) Hall Generator

The most common solution is to use the Hall effect to create a current that flows with the fluid. The normal scheme is to place arrays of short, vertical electrodes on the sides of the duct. The first and last electrodes in the duct power the load. Each other electrode is shorted to an electrode on the opposite side of the duct. These shorts of the Faraday current induce a powerful magnetic field within the fluid, but in a chord of a circle at right angles to the Faraday current. This secondary, induced field makes current flow in a rainbow shape between the first and last electrodes.

Losses are less than a Faraday generator, and voltages are higher because there is less shorting of the final induced current. However, this design has problems because the speed of the material flow requires the middle electrodes to be offset to "catch" the Faraday currents. As the load varies, the fluid flow speed varies, misaligning the Faraday current with its intended electrodes, and making the generator's efficiency very sensitive to its load.

Components shown in FIG. 4 are:
9) Electrodes
10) Faraday current
11) Hall effect current
12) Resultant MHD current
13) External current links 8-3) Disk Generator The third and, currently, the most efficient design is the Hall effect disk generator. This design currently holds the efficiency and energy density records for MHD generation. A disk generator has fluid flowing between the center of a disk, and a duct wrapped around the edge. The magnetic excitation field is made by a pair of circular Helmholtz coils above and below the disk. The Faraday currents flow in a perfect dead short around the periphery of the disk. The Hall effect currents flow between ring electrodes near the center and ring electrodes near the periphery.

Another significant advantage of this design is that the magnet is more efficient. First, it has simple parallel field lines. Second, because the fluid is processed in a disk, the magnet can be closer to the fluid, and magnetic field strengths increase as the 7th power of distance. Finally, the generator is compact for its power, so the magnet is also smaller. The resulting magnet uses a much smaller percentage of the generated power. Components shown in FIG. 5 are:
14) Inlet
15) Outlet
16) Inner electrodes
17) Outer electrodes
18) Hall current
19) Faraday electromotive force direction
B) Magnetic field
9) Review to Previous Invention In Ferfereh and other similar invention (ROTARY HEAT ENGINE, U.S. Pat. No. 6,668,539) nozzles used to rotate the disk. But in Ferfereh used impeller and some guide vans or some radial blades to use centrifugal force that inter to fluid by rotary disk and also used Electric thrusters to accelerate plasma in ducts or generate electricity by MHD system in nozzles.

BRIEF SUMMARY OF THE INVENTION

In this device, the high pressure fluid enters into rotary impeller of the Ferfereh parallel to the axis, so in the impeller the direction of the fluid changes from axial flow to radial flow. Then, the high pressure fluid with high velocity gets out of the convergent-divergent nozzles which are located in the ring. The torque of the reaction force caused by the exit of the fluid around the axis can be used for rotating external axial compressor and the impeller of the Ferfereh and rotary equipment such as generator, pump and etc.

If a fluid which is conductive of the electric current will be used, with the MHD system can generate electricity in impeller and nozzles or just in the nozzles of the Ferfereh or give acceleration to the fluid in flow duct of impeller.

DESCRIPTION OF DRAWINGS AND PARTS

Figure 1:
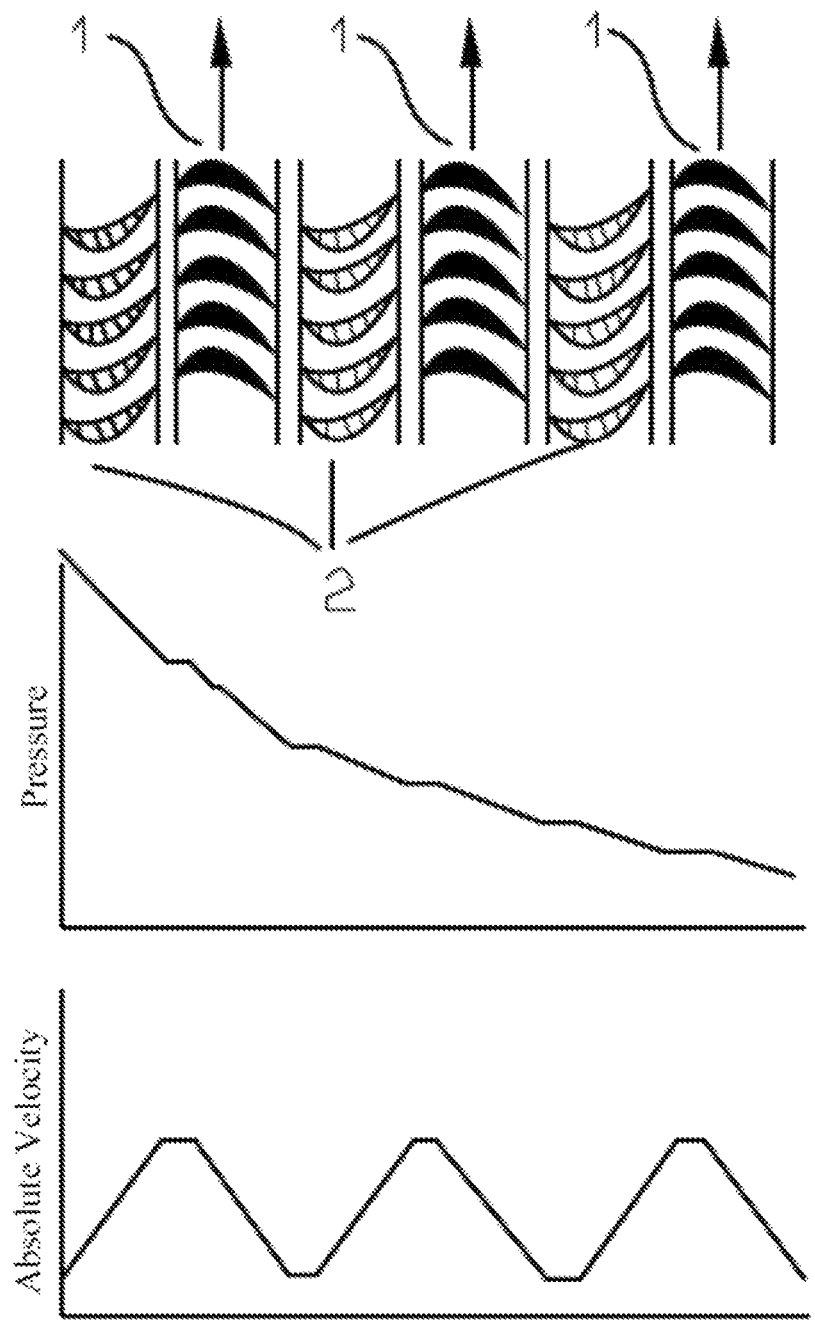
FIG. 1: Three stages of reaction turbine with overall fluid pressures and absolute velocities.
Figure 2:
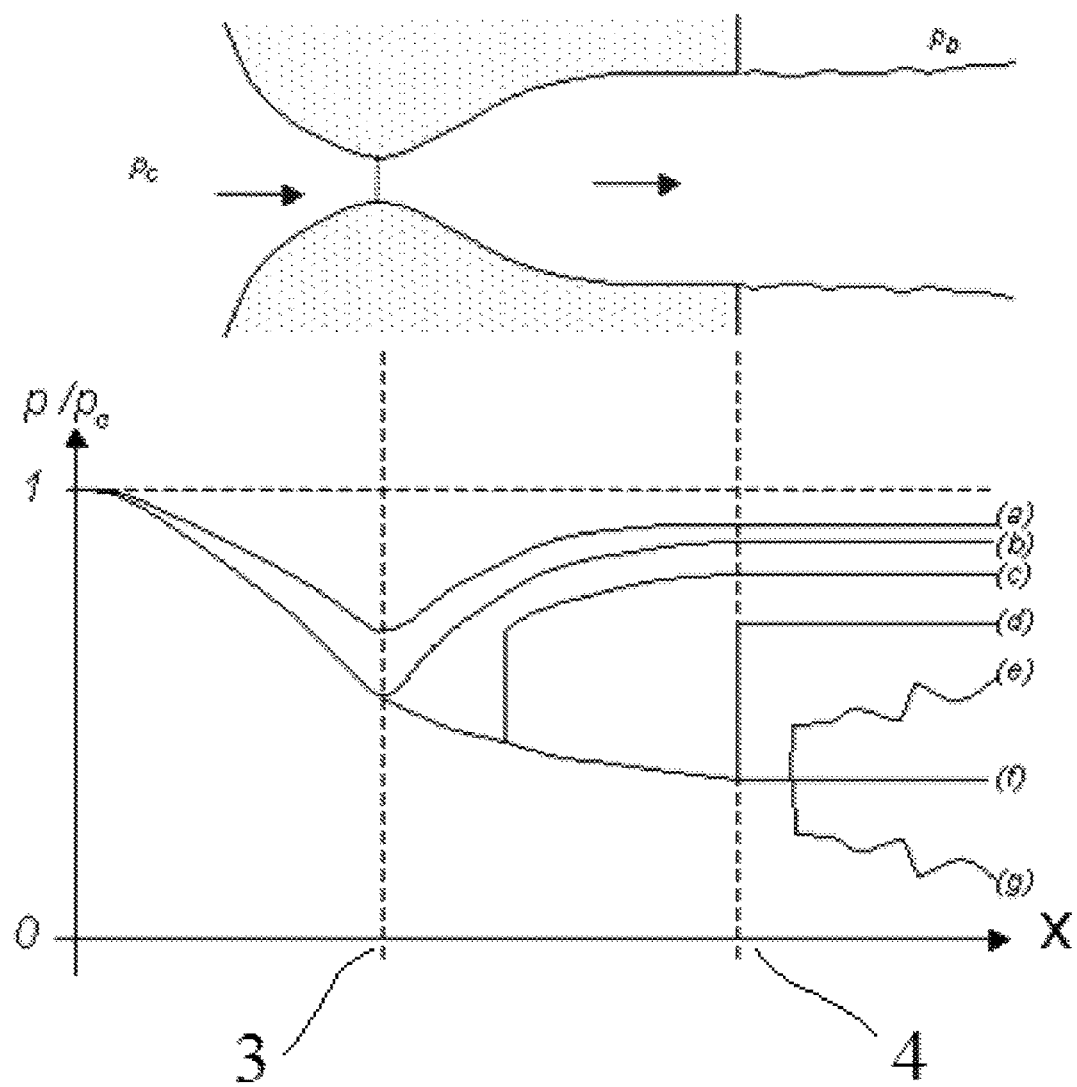
FIG. 2: Pressure distribution along the nozzle in different back pressure.
Figure 3:
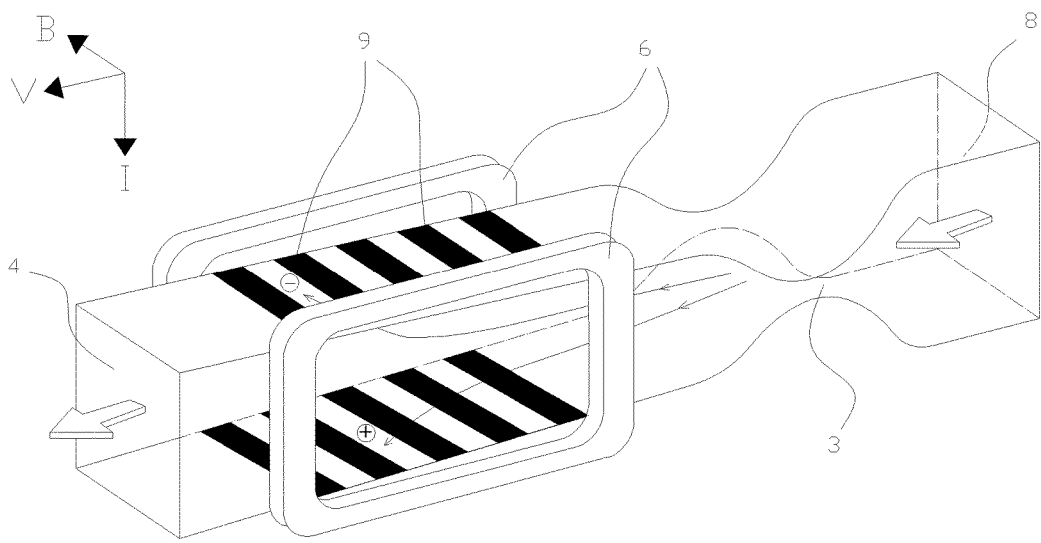
FIG. 3: MHD generator Faraday linear nozzle with segmented electrodes.
Figure 4:
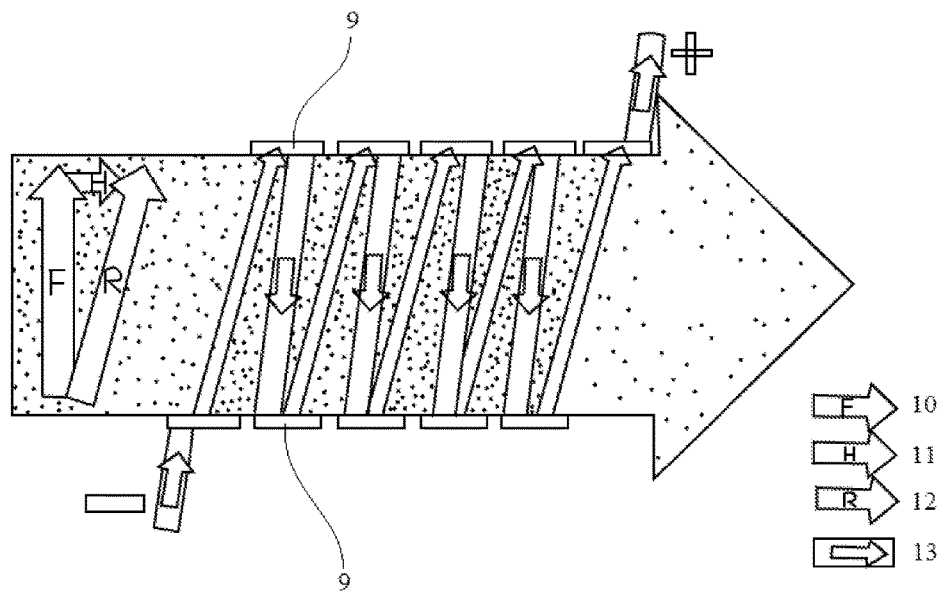
FIG. 4: MHD current flow with segmented electrodes.
Figure 5:
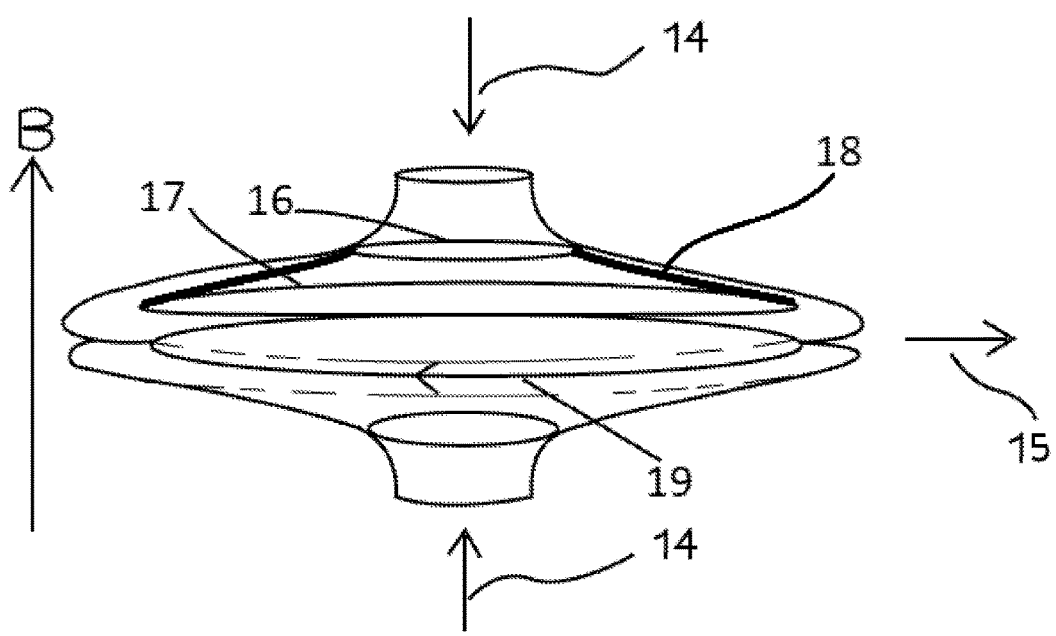
FIG. 5: Diagram of a disk MHD generator showing current flows.
Figure 9:
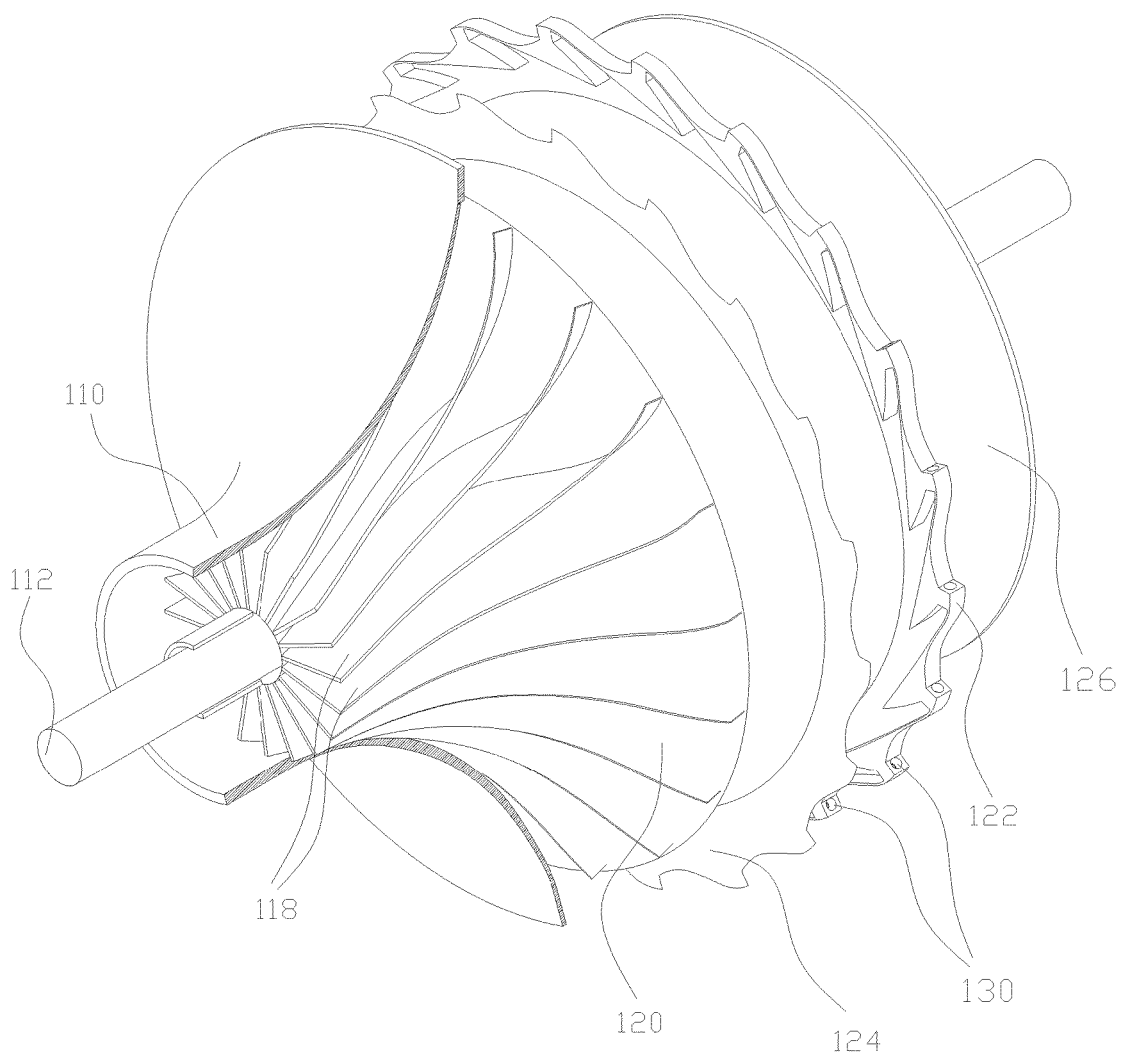
FIG. 9: is an exploded view of the fixed-impeller Ferfereh shown in FIG. 8.
Figure 10:
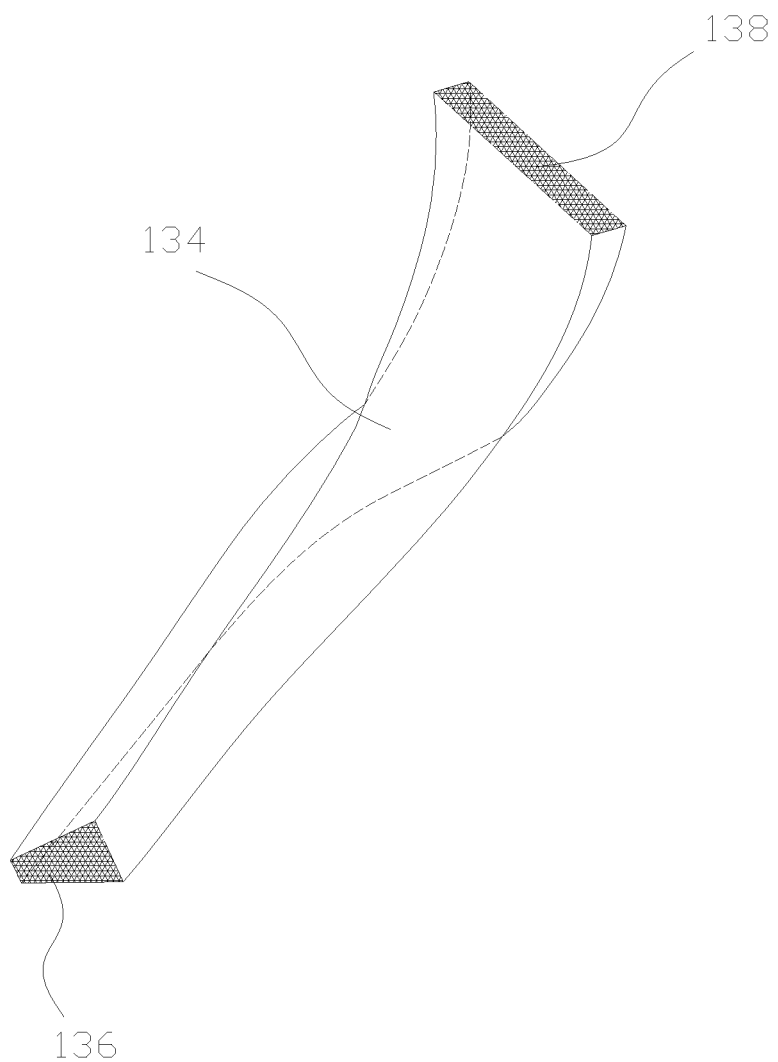
FIG. 10: is a perspective view of a flow channel.
Figure 11:
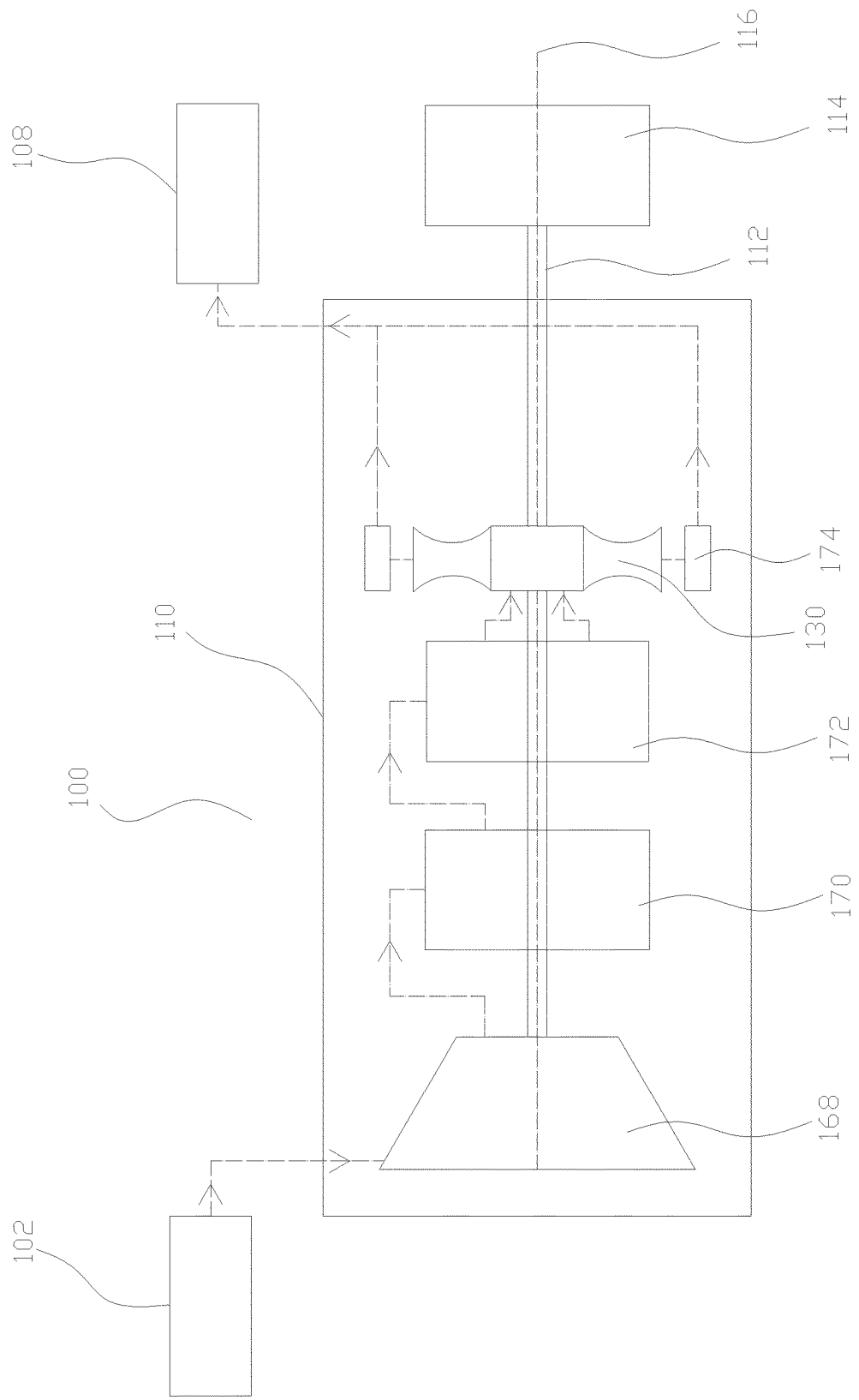
FIG. 11: is a schematic view of a fixed-impeller Ferfereh system with MHD assembly.

FIG. 1: Three stages of reaction turbine with overall fluid pressures and absolute velocities. This figure is composed of:
1) Rotor blades
2) Stationary blades FIG. 2: Pressure distribution along the nozzle in different back pressure. This figure is composed of:
3) Throat of nozzle
4) Outlet of nozzle FIG. 3: MHD generator Faraday linear nozzle with segmented electrodes. This figure is composed of:
3) Throat of nozzle
4) Outlet of nozzle
9) Segmented electrodes
6) Solenoids
8) Inlet of nozzle FIG. 4: MHD current flow with segmented electrodes. This figure is composed of:
9) Electrodes
10) Faraday current
11) Hall effect current
12) Resultant MHD current
13) External current links FIG. 5: Diagram of a disk MHD generator showing current flows. This figure is composed of:
14) Inlet
15) Outlet
16) inner electrodes
17) Outer electrodes
18) Hall current
19) Faraday electromotive force direction
B) Magnetic field FIG. 6: is a schematic view of a fixed-impeller Ferfereh system. This figure is composed of:
100) Fix impeller ferfereh
102) Fluid inlet of the fix impeller ferfereh
108) Fluid outlet of the ferfereh
110) Casing
112) Shaft
114) Rotary equipment
116) Centerline axis
130) Nozzle
172) Fix impeller and magneto hydrodynamic accelerator and seeding assembly
174) Magneto hydrodynamic generator assembly FIG. 7: is a cross-sectional view of the fixed-impeller Ferfereh. This figure is composed of:
4) Outlet surface of the nozzle
8) Inlet surface of the nozzle
102) fluid inlet of the fix impeller ferfereh
108) fluid outlet of the ferfereh
110) Casing
112) Shaft
116) Centerline axis
118) Stationaiy vanes
120) Impeller
122) Ring
124) Cover of the ring
126) Disk
128) Path of the fluid
130) Nozzle
132) Gas seal
136) Inlet surface of the flow channel
138) Outlet surface of the flow channel
148) Upstream surface of the ring
150) Downstream surface of the ring
156) Segmented electrodes
158) Electrical conductor plates
160) Conductive ring coupled to the casing
162) Slip joint between conductive ring and electrodes
164) Electrical circuit
178) Seeding assembly FIG. 8: is a perspective view of a fixed-impeller Ferfereh. This figure is composed of:
110) Casing
112) Shaft
118) Stationary vanes
120) Impeller
122) Ring
124) Cover of the ring FIG. 9: is an exploded view of the fixed-impeller Ferfereh shown in FIG. 8. This figure is composed of:
110) Casing
112) Shaft
118) Stationary vanes
120) Impeller
122) Ring
124) Cover of the ring
126) Disk
130) Nozzle FIG. 10: is a perspective view of a flow channel. This figure is composed of:
134) Flow channel
136) Inlet surface of the flow channel
138) Outlet surface of the flow channel FIG. 11: is a schematic view of a fixed-impeller Ferfereh system with MHD assembly. This figure is composed of:
100) Fix impeller ferfereh
102) Fluid inlet of the fix impeller ferfereh
108) Fluid outlet of the ferfereh
110) Casing
112) Shaft
114) Rotary equipment
116) Centerline axis
130) Nozzle
168) Compressor section
170) Heat source section
172) Fix impeller and magneto hydrodynamic accelerator and seeding assembly
174) Magneto hydrodynamic generator assembly FIG. 12: is a cross-sectional of a fixed-impeller Ferfereh with MHD assembly shown in FIG. 11. This figure is composed of:
1) Rotor turbine blades
102) Fluid inlet of the fix impeller ferfereh
108) Fluid outlet of the ferfereh
110) Casing
112) Shaft
116) Centerline axis
118) Stationary vanes
120) Impeller
124) Cover of the ring
126) Disk
128) Path of the fluid
130) Nozzle 132) Gas seal
136) Inlet surface of the flow channel
138) Outlet surface of the flow channel
140) Combustion chamber assembly
142) Upstream surface of the combustion chamber
144) Downstream surface of the combustion chamber
158) Electrical conductor plates
160) Conductive ring coupled to the casing
162) Slip joint between conductive ring and electrodes
164) Electrical circuit
176) Axial compressor
178) Seeding assembly
B) Magnetic field FIG. 13: is a cross-sectional view of a fixed-impeller Ferfereh with combustion chamber. This figure is composed of
1) Rotor turbine blades
2) Stationary turbine blades
102) Fluid inlet of the fix impeller ferfereh
108) Fluid outlet of the ferfereh
110) Casing
112) Shaft
116) Centerline axis
118) Stationary vanes
120) Impeller
122) Ring
124) Cover of the ring
126) Disk
128) Path of the fluid
130) Nozzle
132) Gas seal
136) inlet surface of the flow channel
138) outlet surface of the flow channel
140) Combustion chamber assembly
142) Upstream surface of the combustion chamber
144) Downstream surface of the combustion chamber
160) Conductive ring coupled to the casing
162) Slip joint between conductive ring and electrodes FIG. 14: is a perspective view of a fixed-impeller Ferfereh with combustion chamber. This figure is composed of:
1) Rotor turbine blades
2) Stationary turbine blades
110) Casing
112) Shaft
118) Stationary vanes
120) Impeller
122) Ring
124) Cover of the ring
130) Nozzle
140) Combustion chamber assembly
144) Downstream surface of the combustion chamber FIG. 15: Comparison of Non-axial fixed-impeller Ferfereh and fixed-impeller axial Ferfereh. This figure is composed of:
116) centerline axis
130) nozzle
182) $V_S$=Relative velocity of the fluid at the nozzle outlet
α) The angle of the flow velocity vector at the nozzle outlet with the axis of rotation.

Figure 16:
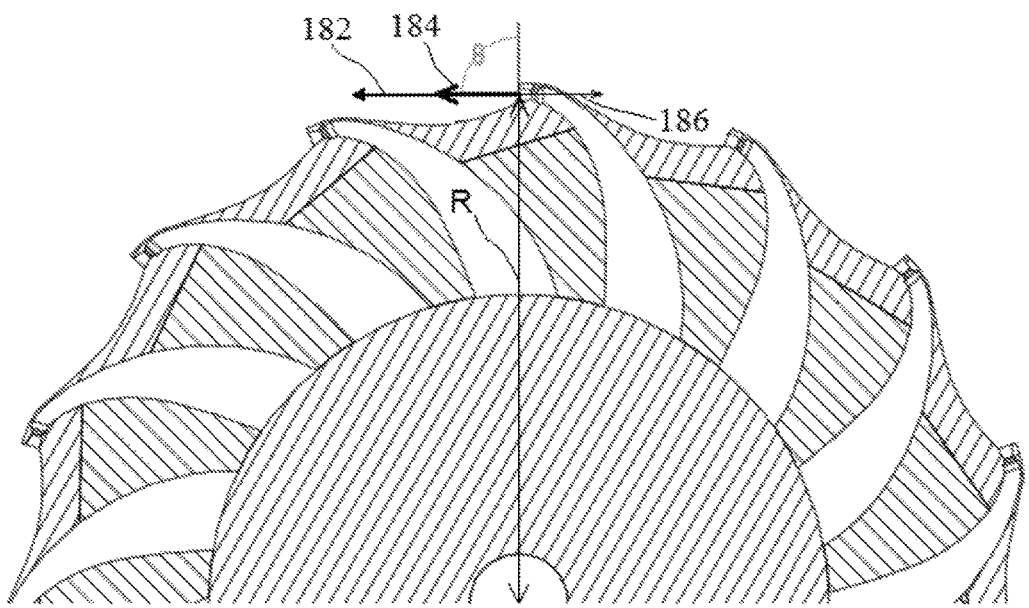
FIG. 16: Components of velocity vector in the Non-axial fixed-impeller Ferfereh.

FIG. 16: Components of velocity vector in the Non-axial fixed-impeller Ferfereh. This figure is composed of:
182) Relative velocity of the fluid at the nozzle outlet
184) Absolute velocity of the fluid in the nozzle outlet
186) The velocity of the center of nozzle
R) Space between the outlet plane center of the nozzle and the axis of rotation
θ) Angle of the flow velocity vector at the nozzle exit with radius.

Figure 17:
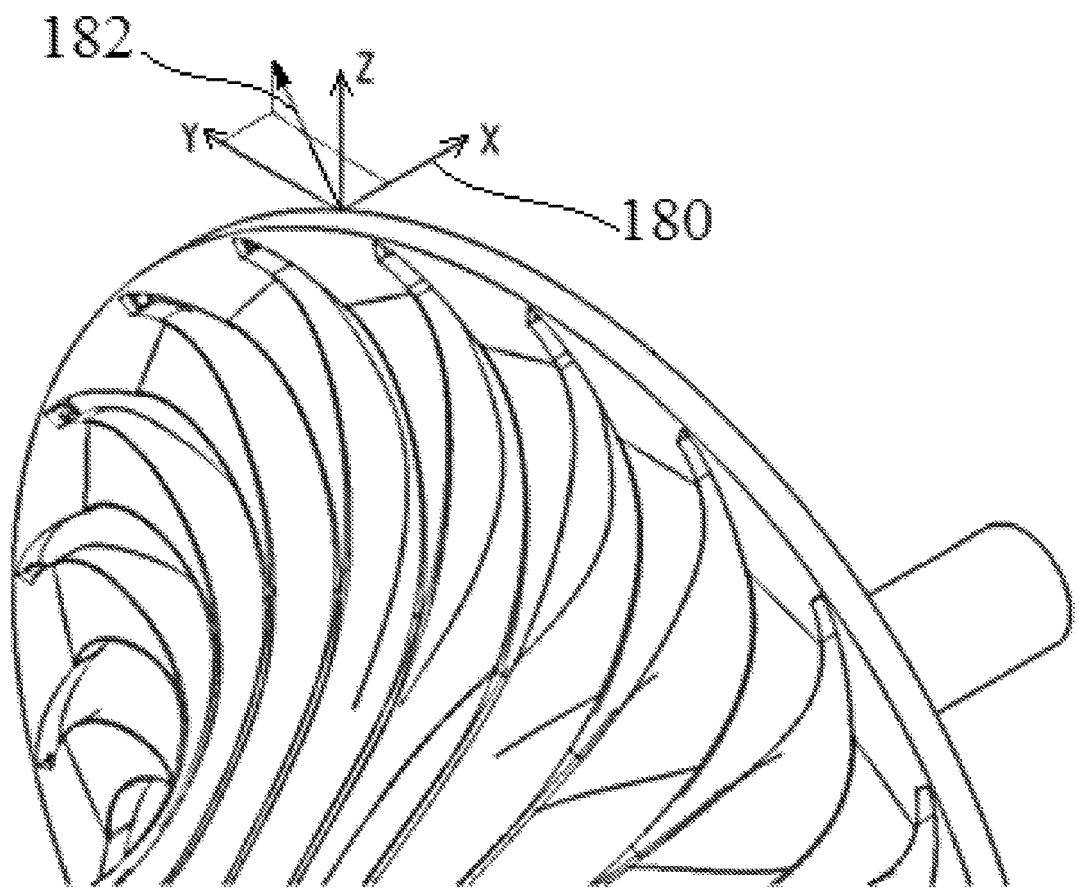
FIG. 17: Components of velocity vector in the axial fixed-impeller Ferfereh.

FIG. 17: Components of velocity vector in the axial fixed-impeller Ferfereh. This figure is composed of:
180) Relative coordinate system which is linked to the ring
182) Relative velocity of the fluid at the nozzle outlet.

DETAILED DESCRIPTION OF THE INVENTION

Figure 6:
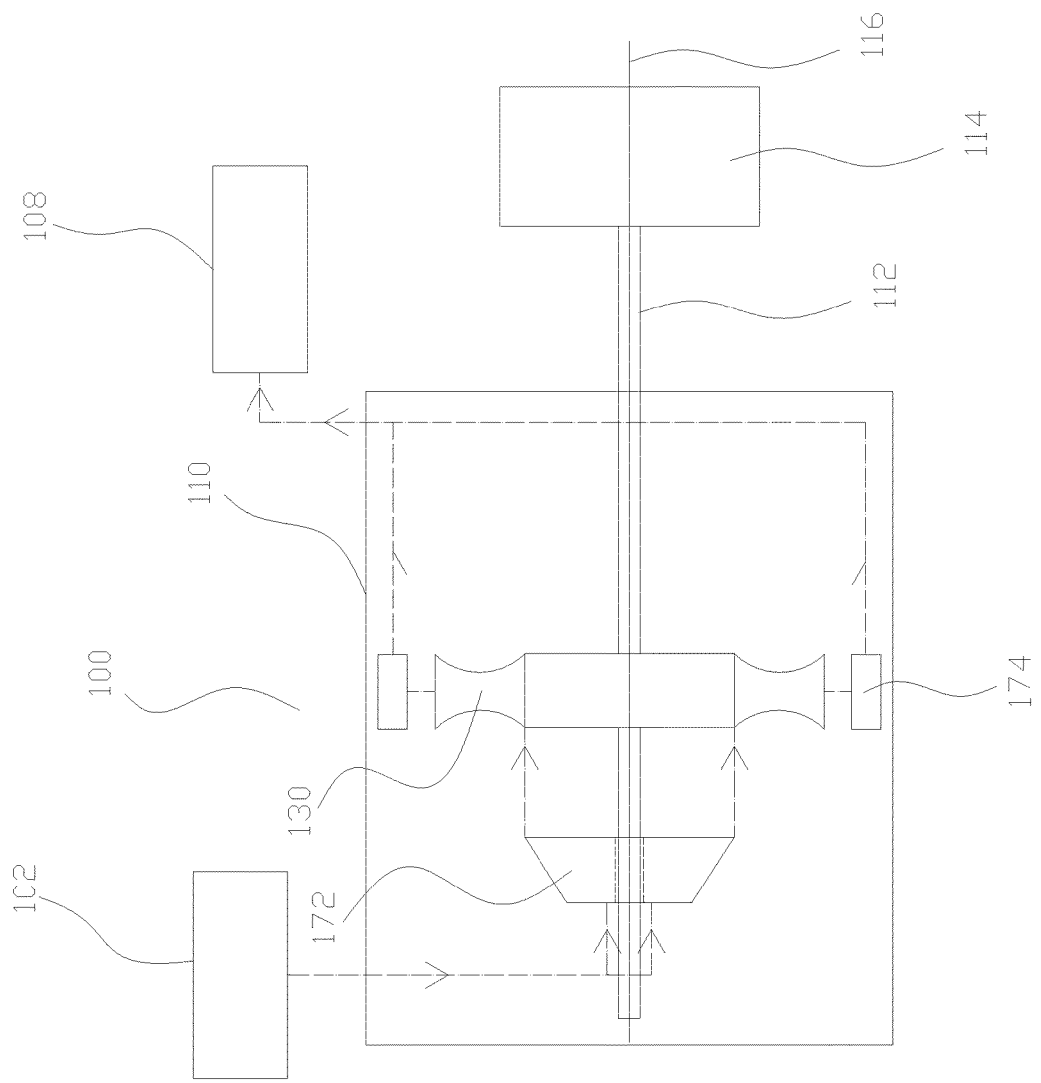
FIG. 6: is a schematic view of a fixed-impeller Ferfereh system.

The general components of an ordinary Ferfereh are shown in FIG. 6. Ferfereh is formed by a closed impeller in which a fluid with high pressure Pin enters the impeller parallel to the shaft, changes the direction perpendicular to the impeller's radius through the inner curve of the impeller and guide vanes, and then exits at high velocity through a converging-diverging nozzle mounted in the outer ring of the impeller. Therefore, the pressure ($P_{out}$) at the nozzle outlet plane is much less than the inlet fluid pressure ($P_{in}$) (the amount $P_{in}$ and $P_{out}$ must be considered in the design so that the fluid in the nozzle can be expanded isentropically). In the nozzle, the decrease of fluid pressure rapidly increases its velocity at the nozzle outlet.

When the fluid velocity at the nozzle outlet reaches $V_s$, (the relative velocity of a fluid against the nozzle outlet surface), it creates the reaction force F in the direction opposite to the fluid motion, whose value is equal to:

$$F = \dot{m} V_s$$

Figure 15:
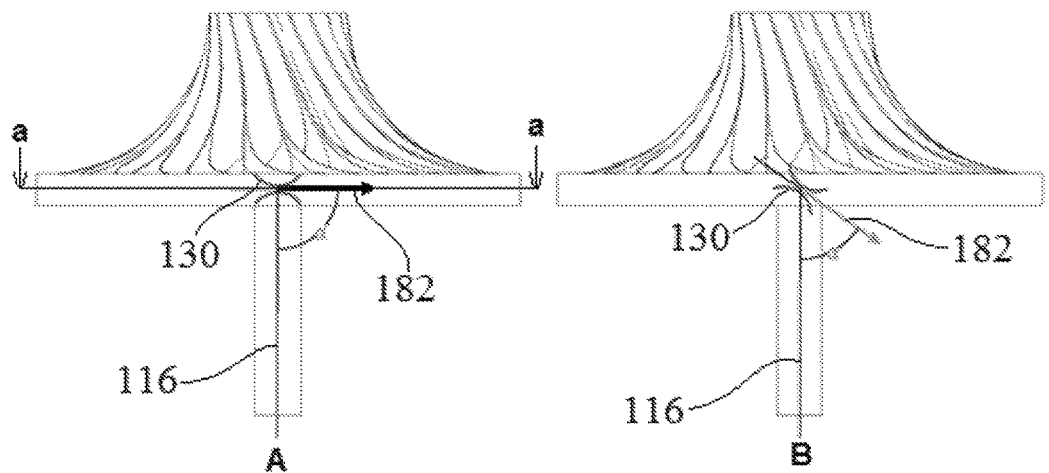
FIG. 15: Comparison of Non-axial fixed-impeller Ferfereh and fixed-impeller axial Ferfereh.

By taking the cross product of the force and the distance R, (the distance from the center of the nozzle outlet to the axis of rotation), torque generated around the axis is obtained, which in turn causes the impeller to rotate about the axis (FIG. 15).

$$T = R \times F = F R \sin \theta$$

In the Ferfereh, the machine's impeller is rotated, with an angular velocity ω about the axis of rotation, by the torque generated by the outflow of fluid, as a result of which the fluid is accelerated by a centrifugal force that is caused by rotation along the radius of the impeller. Fluid duct should be designed such that the increased velocity is converted into pressure increase.

The resulting moment is used partly to rotate the impeller of Ferfereh, partly to rotate external axial compressor for producing an inlet high pressure fluid, and the rest (net torque of the Ferfereh) to rotate equipment such as generators, pumps, etc.

Figure 8:
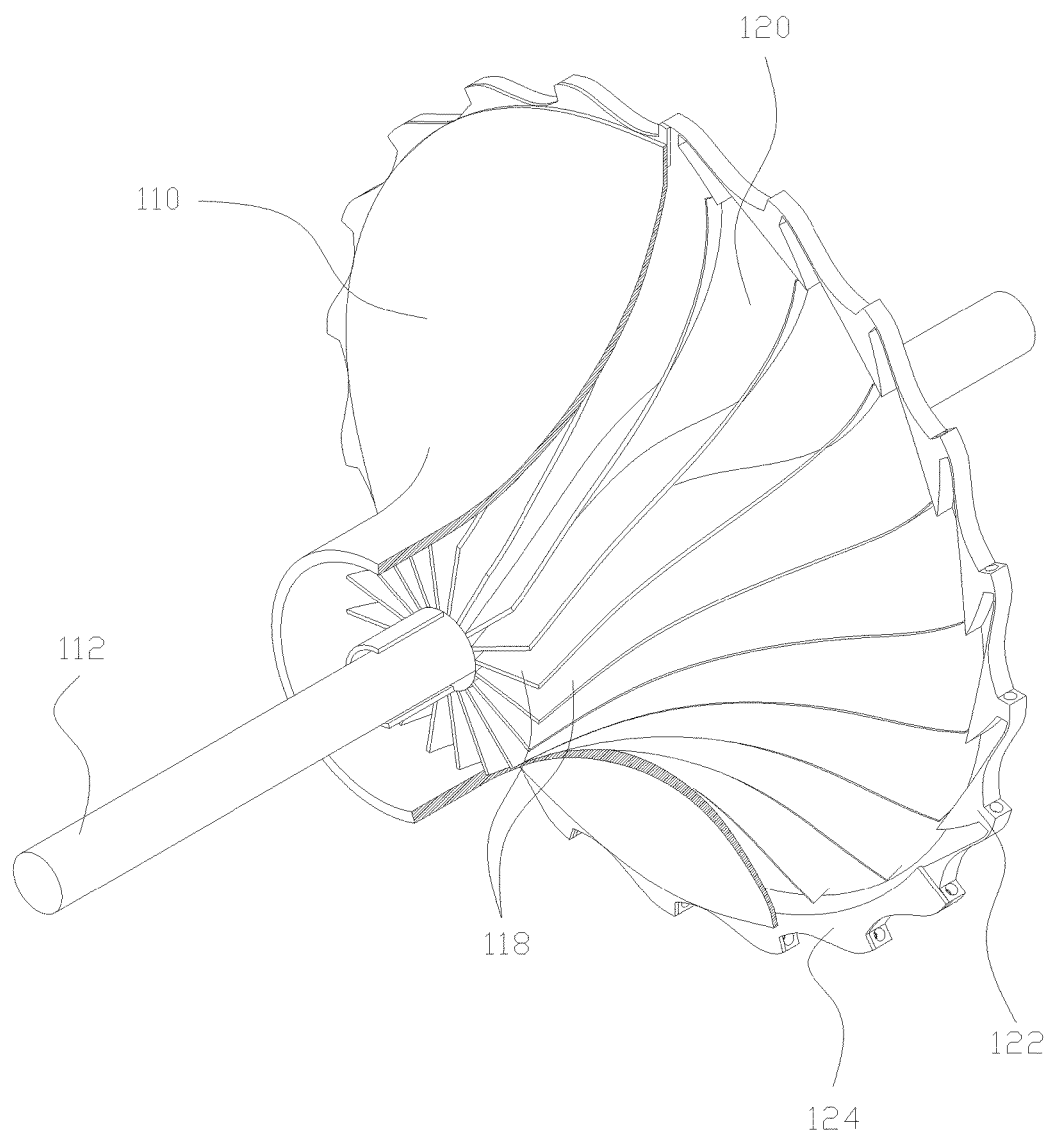
FIG. 8: is a perspective view of a fixed-impeller Ferfereh.

A) Components of a Fixed Impeller Ferfereh
As shown in FIG. 8, the main components of a fixed impeller Ferfereh are:
Impeller
Converging-diverging nozzles
Casing
Stationary vanes
Shaft
MHD system (optional, not shown in FIG. 8) and
Heat source (not shown in FIG. 8).

B) Description of the Components of a Fixed Impeller Ferfereh:
B-1) Impeller:
The main function of the impeller is to change the direction of inlet fluid flow from the axial to the radial direction. The vanes located on the impeller can be mounted on the impeller or etched in the manufacturing process of the impeller.

The impeller should be designed so that:
Minimum energy loss due to fluid friction occurs.

B-2) Converging-Diverging Nozzles:

In nozzles, the fluid pressure from inlet pressure Pin is isentropically lowered to the outlet pressure $P_{out}$, so that it causes an increase in the fluid velocity at the nozzle outlet plane. This increase results in a driving force in the opposite direction of the fluid motion, which in turn will cause the impeller to rotate around the axis.

The nozzles should be designed so that:
- At the working pressure range of Ferfereh, the nozzle fluid is isentropically expanded; on which no normal and oblique shock wave occur.
- As the efficiency of the Ferfereh is completely independent of nozzle efficiency, the nozzle should be designed so that it has the highest efficiency in the working pressure range of Ferfereh.
- It has a minimum length.
- High-velocity passage of fluid causes corrosion and erosion, which change the radius of the throat, which will reduce the efficiency of the nozzle and Ferfereh. So nozzles should be designed so that they are replaceable. To select materials consisting of a nozzle, in addition to the wear and corrosion resistance, a special attention should be paid to factors such as the fluid temperature, stresses caused by rotation, and pressure difference.
- Distance between two adjacent nozzles be enough that outlet fluid does not clash with next nozzle B-3) Stationary Vanes:

The function of stationary vanes is to guide the flow of fluid from the impeller inlet to the inlets of converging-diverging nozzles. They are responsible for the function of avoiding relative eddy currents between impeller vanes. In the Ferferehs that operate with high-temperature fluid, hollow stationary vanes can be used to pass a cooling fluid. Furthermore, the vanes should be designed so that, in addition to an energy loss due to fluid friction, the cross section of the fluid duct is such that fluid velocity would be the same in the whole path, and that an increase in fluid velocity due to centrifugal force is converted into increase of pressure.

In the Ferferehs that MHD systems are designed to accelerate conductive fluid, the electrically insulated stationary vanes are used, on both sides of which electrically conductive metal plates (electrodes) are inserted and each electrode is separately connected to the positive or negative pole.

B-4) Casing:

It is responsible for separating fluid from the environment. Furthermore, some bearings are placed on the casing.

B-6) Shaft:

B-8) MHD Systems (Optional):

If the fluid in Ferfereh is electrically conductive, the MHD system can be used to produce electricity or to accelerate a hot fluid in the path. The items listed above are described separately below:

B-8-1) Generation of Electricity:

Using a rectangular nozzle, electric current can be generated at the nozzle outlet. This method can be used for the Ferferehs wherein the heat source is placed before the nozzle inlets. In addition, in impeller, electricity can be generated using electrically conductive fluid by connecting the ring electrodes of various radial to the inner side of the casing and creating a suitable magnetic field in the axial direction. Of course, for low speed of fluid in impeller, this method is not useful (for more information refer to MHD disk generator).

Figure 7:
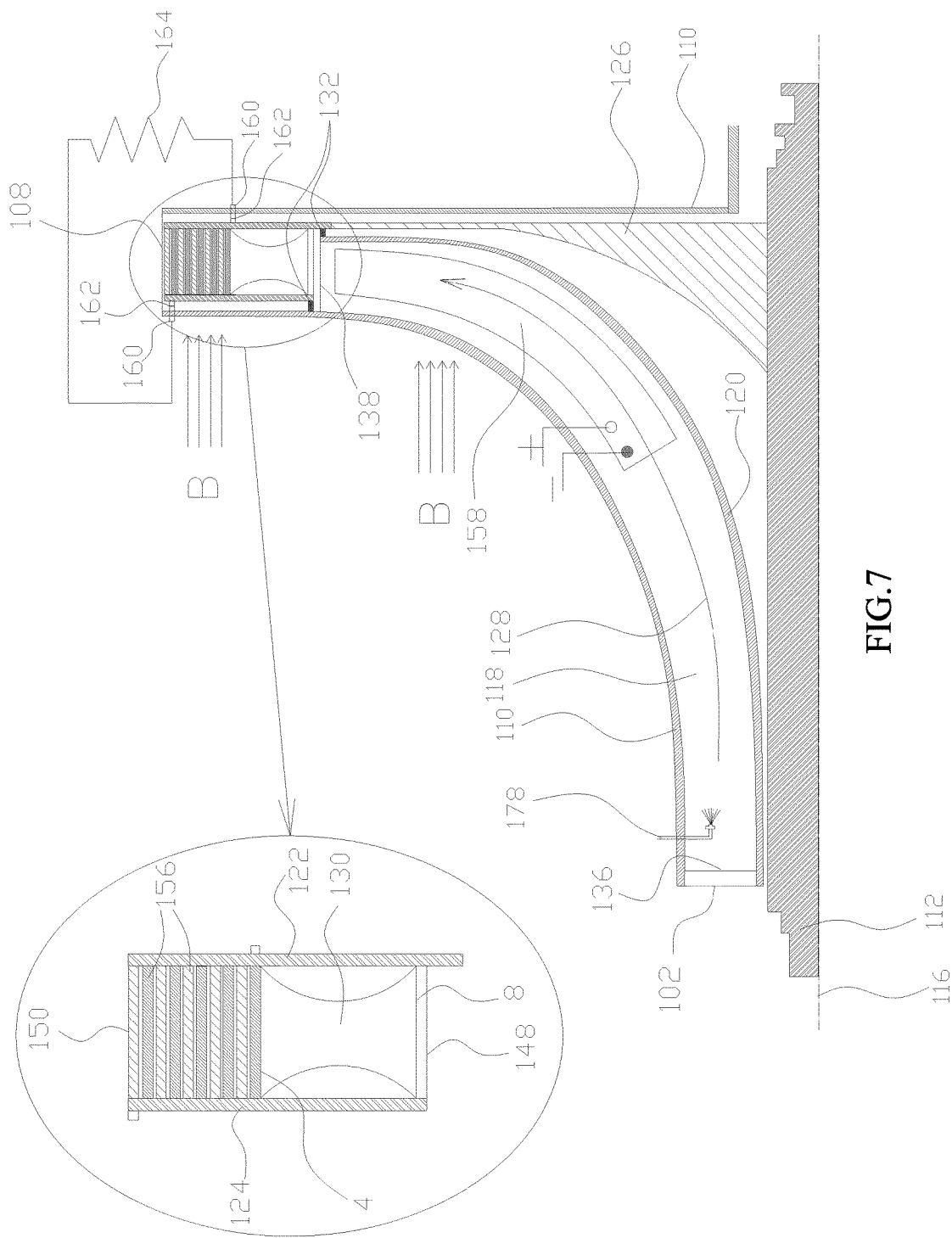
FIG. 7: is a cross-sectional view of the fixed-impeller Ferfereh.

B-8-2) Acceleration of Conductive Fluid (FIG. 7):

In the Ferferehs that conductive fluid passes through an impeller, conductive fluid can be accelerated in a duct from inlet to outlet of an impeller using the electrically insulated stationary vanes and plates (as electrodes) that are placed on both outer sides of stationary vanes and by connecting the electrodes to positive and negative poles of a DC power source. The electrodes can be connected to positive and negative poles of a DC power source using the hollow bar shaft and special cables (FIG. 7). If a magnetic field is applied in the axial direction, and electric field perpendicular to two electrodes connected to the stationary vanes, then the fluid is accelerated along the fluid duct, according to the right-hand rule.

B-8-3) Combinations of the Above Methods:

In the Ferferehs that the fluid from the impeller inlet to nozzle outlets is electrically conductive; with MHD method can generate electricity, at the nozzles, which can use this electricity to accelerate electrically conductive fluid in the impeller duct of the Ferfereh. Stationary vanes and fluid duct cross-section in the impeller should be so designed that the increased velocity is converted into increase of pressure. Magnetic nozzles have also been proposed for some types of propulsion, in which the flow of plasma is directed by magnetic fields instead of walls made of solid matter.

It should be noted that the fluid passes through a converging-diverging nozzle in regular MHD generators, in which only electrical energy caused by the ionization of electrically conductive fluid is used and the kinetic energy of high velocity fluid exhaust from the nozzle is ignored (in MHD power plant); while a Ferfereh is allowed to use the kinetic energy of the high velocity exhaust of fluid, as well as the electrical energy caused by the ionization of electrically conductive fluid in motion. In addition, direct current (DC) is the electricity produced (if B be constant) and consumed by the MHD method, and peripheral devices are needed to convert it into alternating current.

B-9) Heat Source:

There are different types of heat source that can use for heating to fluid in Ferfereh such as:
- Heat source with fuel injection
- Heat source with radio frequency (RF)
- Heat source with nuclear energy and etc.

If fluid is gaseous phase or two-phase liquid-gas, converging-diverging nozzles will be used.

Figure 12:
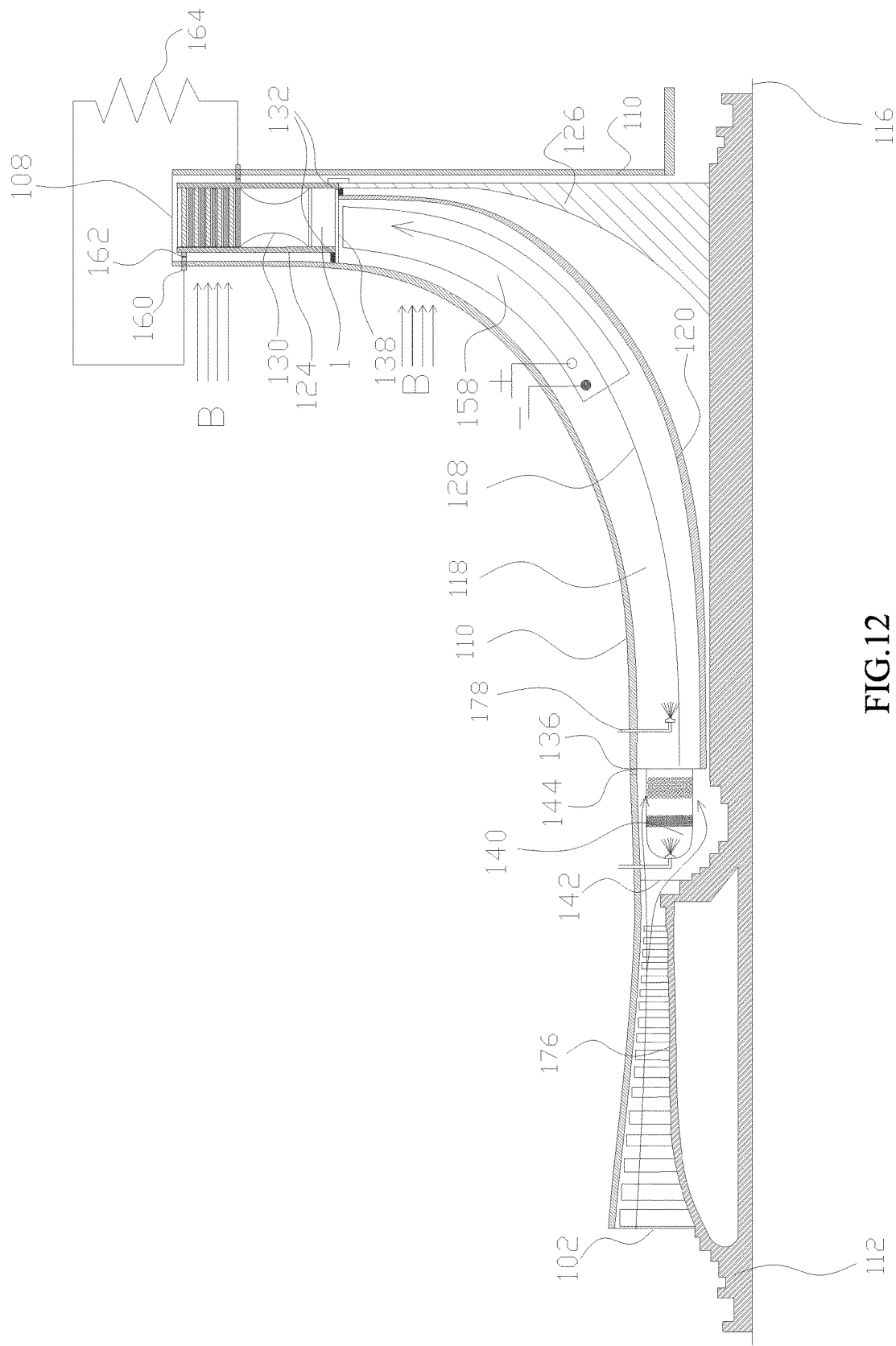
FIG. 12: is a cross-sectional of a fixed-impeller Ferfereh with MI-ID assembly shown in FIG. 11.

C) Classification of Ferferehs:

Ferferehs can be categorized according to their impeller types or the direction of fluid discharging. We try to explain each in the following:

C-1) Classification of Ferferehs According to their Impeller Types:

C-1-1) Ferfereh with Fixed-Impeller:

In this case, the fluid is compressed in a compressor and as a result its temperature and pressure will be increased. In the next step, the fluid enters the heat source (combustion chamber) and after receiving energy in a nearly constant pressure which leads to its temperature rise, pours into a Ferfereh with a fixed impeller. As shown in FIG. 12, the impeller redirects the flow of fluid from the axial to radial one.

Figure 13:
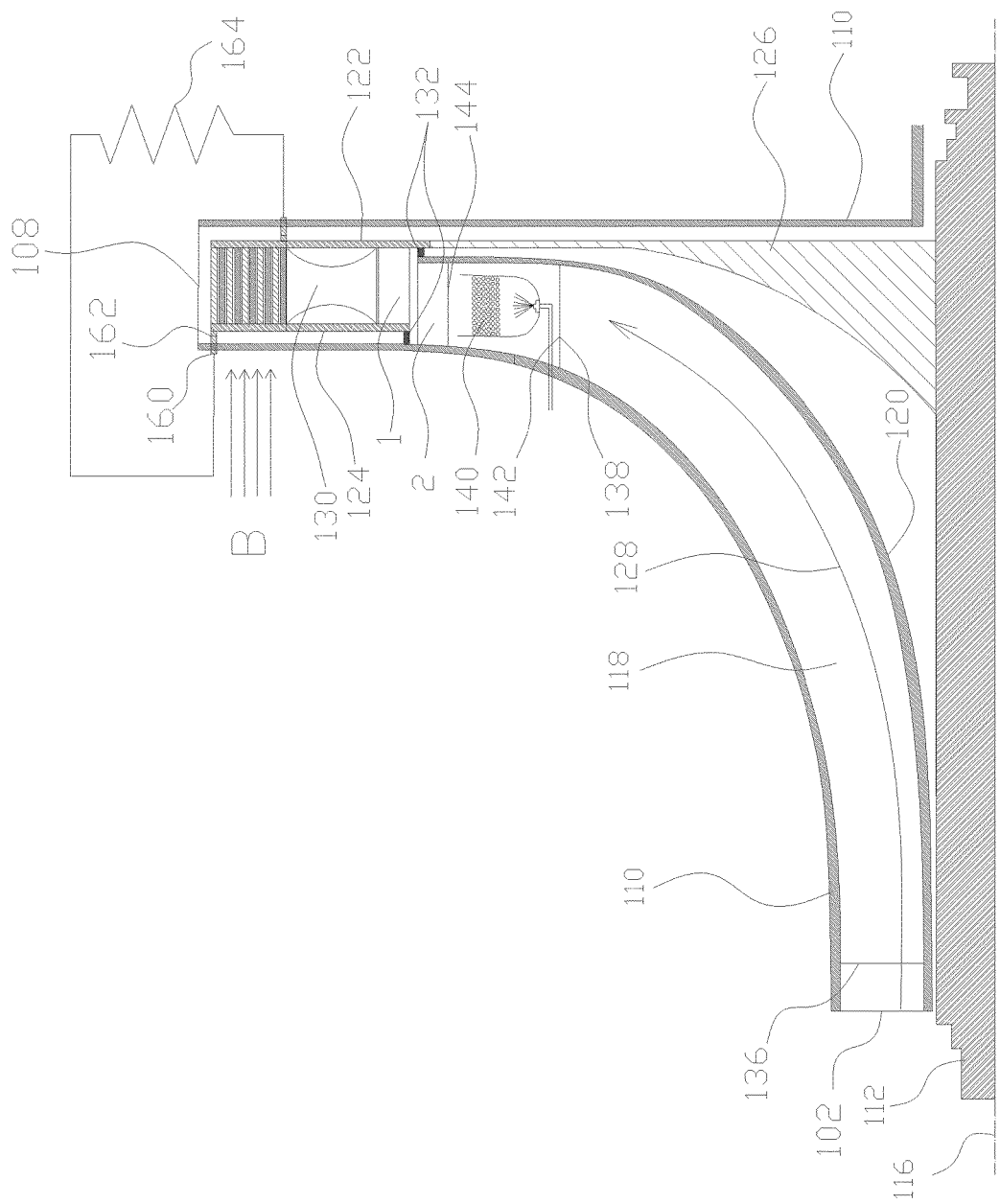
FIG. 13: is a cross-sectional view of a fixed-impeller Ferfereh with combustion chamber.

The heat source (combustion chamber) can be placed in the fixed impeller exit which is linked to it (FIG. 13). It's better to place the heat source (combustion chamber) in the entry of the impeller while using MHD system (FIG. 7, FIG. 12), but in the cases when it is not used, heat source prefer to be located in the exit of fixed-impeller (FIG. 13).

In this kind of Ferfereh, because of the existence of a fixed impeller, there will be no increase in the temperature and pressure caused by the rotation of the impeller and only the fluid's direction will be changed. Then, the fluid enters into the rotating part of the impeller on which the convergent-divergent nozzles exist and gets out of them with high velocity.

Advantages:
There will be no hot fluid compression in the impeller.
Its theoretical efficiency is much more than the ordinary Ferfereh.
MHD system can be used for the acceleration of the conductive fluid in the impeller or for the power generation in nozzles and impellers.

Disadvantages:
There is a possibility of the occurrence of normal or oblique shock wave in the border between the rotating and fixed parts.
It's necessary to seal the boundary of rotating and fixed parts.
It's necessary to protect the stationary vanes and the impeller in a high temperature.
If use liquid in Ferfereh, convergent nozzles will be used and the heat source will be eliminated.

C-1-2) Ferfereh with Fixed-Impeller and Turbine Stage (FIG. 12,14):

In this case, the fluid is compressed in a compressor and as a result its temperature and pressure will be increased. In the next step, the fluid enters the heat source (combustion chamber) and after receiving energy in a nearly constant pressure which leads to its temperature rise, pours into a Ferfereh with a fixed impeller. As shown in FIG. 12, the impeller redirects the flow of fluid from the axial to radial one.

The heat source (combustion chamber) can be placed in the fixed impeller existence which is linked to it. It's better to place the heat source (combustion chamber) in the entry of the impeller while using MHD system, but in the cases when it is not used, heat source prefer be located in the exit of fixed-impeller.

In this kind of Ferfereh, because of the existence of a fixed impeller, there will be no increase in the temperature and pressure caused by the rotation of the impeller and only the fluid's direction will be changed. Then, the fluid enters into the rotating part of the impeller on which the convergent-divergent nozzles exist and gets out of them with high velocity. Not only the blades of the turbine convert the kinetic energy of the fluid to the mechanical energy, they also act as channels to set the entry direction of the fluid toward the nozzles.

Advantages:
There will be no hot fluid compression in the impeller.
Its theoretical efficiency is much more than the ordinary Ferfereh.
MHD system can be used for the acceleration of the conductive fluid in the impeller or for the power generation in nozzles and impellers.

Disadvantages:
There is a possibility of the occurrence of normal or oblique shock waves in the border between the rotating and fixed parts.
It's necessary to seal the boundary of rotating and fixed parts.
It's necessary to protect the stationary vanes and the impeller in a high temperature.

Figure 14:
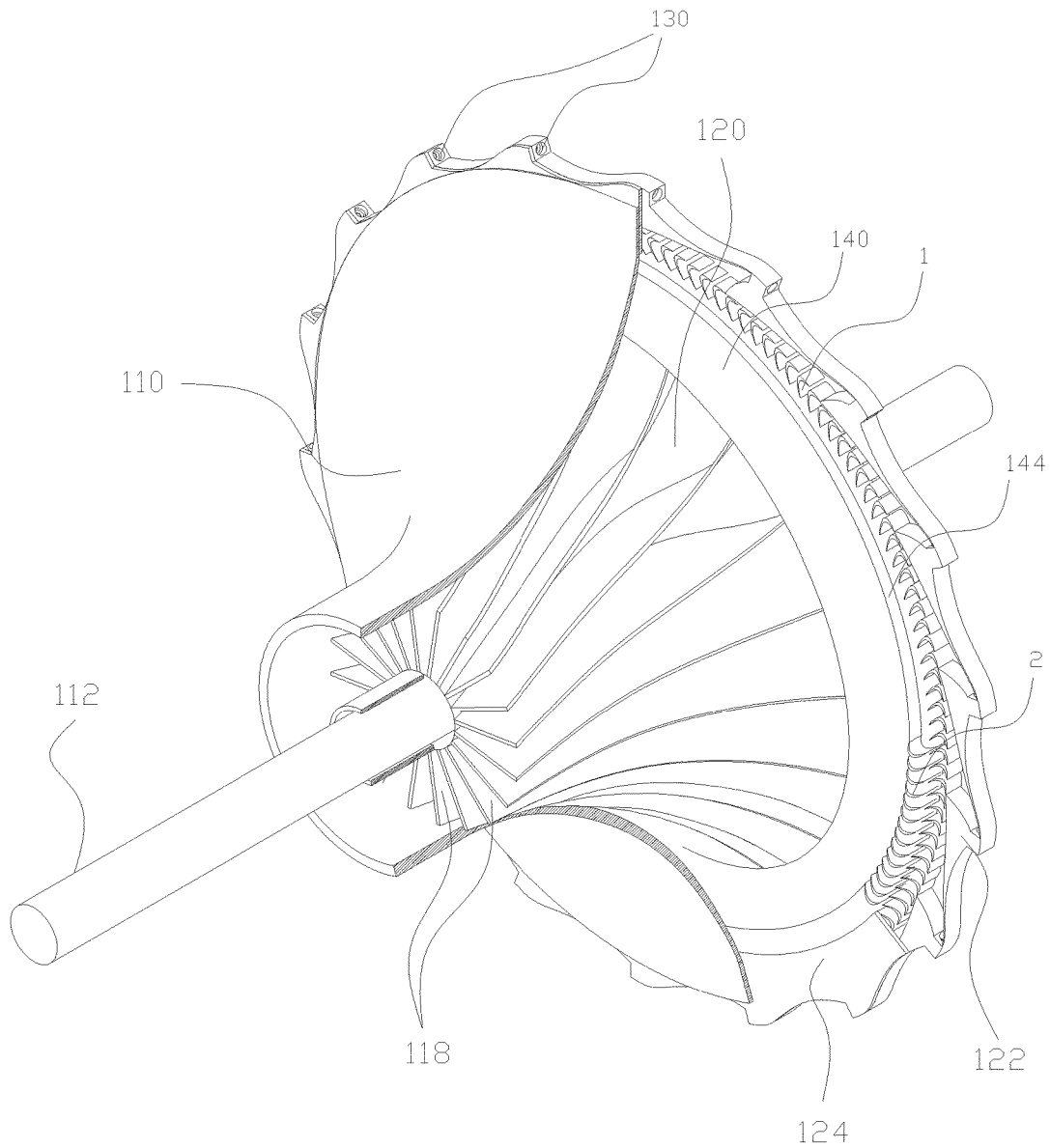
FIG. 14: is a perspective view of a a fixed-impeller Ferfereh with combustion chamber.

C-2) Classification of Ferfereh Based on the Direction of Discharging Fluid:

All the Ferferehs mentioned above are divided into two types of axial flow and non-axial flow according to the direction of discharging fluid (FIG. 14). In an axial Ferfereh the flow velocity vector in nozzle existence has a component in line with the axis direction and, while in a non-axial Ferfereh the flow velocity vector does not have any components in axis direction.

C-2-1) Non-Axial Ferfereh:

According to the FIG. 14-A, in these types of Ferferehs the direction of the flow velocity vector at the nozzle exit is perpendicular to the axis of rotation ($\alpha=90°$) and it does not have any components along the axis. In this case, the purpose is to rotate rotary appliances such as a generator, pump, compressor, etc.

The angle of the flow velocity vector at the nozzle exit with radius (angle $\theta$) is characterized in design. The Ferferehs with the angle $\alpha=\theta=90°$ (FIG. 15) have the highest theoretical efficiency. FIG. 15 is section view a-a in FIG. 14.

C-2-2) Axial Ferfereh:

According to the FIG. 14-B, in this type of Ferfereh the trajectory of the flow velocity vector at the nozzle exit makes the angle ($\alpha$) with the axis of rotation which is less than 90°. Given the fact that in Ferferehs the whole drop of enthalpy occurs in the nozzles and in plane engines we need the driving force in line with the axis. With use of this type of Ferfereh in which the flow velocity vector has components in the direction of the axis (FIG. 16) can be used in providing the necessary torque for rotating the compressor, also the reaction force component caused by the high velocity exit of the fluid in line with the axis leads to the propulsion of the plane.

D) Usage of Ferfereh

Ferferehs can be used like a turbine gas cycle separately; or in combined cycle that can use from heat of external fluid from gas Ferfereh to produce steam for steam cycle. Into Ferferehs which combustion take place in the nozzles entrance, for cooling internal gas to Ferfereh (from axial compressor) can preheat the feed water to the boiler.

What is claimed is:

1. A device defining a fixed impeller ferfereh comprising:
   a casing defining a cavity extending between a fluid inlet of said ferfereh and a fluid outlet of said ferfereh;
   a shaft positioned within said casing and defining a centerline axis, said shaft rotatably coupled to a rotary equipment;
   a plurality of stationary vanes coupled to said casing, adjacent said vanes forming a pair and oriented such that a flow channel is defined between each said pair of adjacent vanes, said flow channel extending between an inlet surface and an outlet surface;
   an impeller coupled to said vanes wherein said casing, said stationary vanes and said impeller made of or covered with non-electrical conductor material;
   a fluid;
   a seeding assembly;
   a magneto hydrodynamic accelerator assembly comprising a magnetic field and a plurality of electrical conductor plates coupled to each side of said vanes and said plates connected to a positive or a negative pole;
   a disk coupled to said shaft;
   a ring coupled to said disk comprising an upstream surface and a downstream surface;
   a plurality of nozzles that coupled to said ring and positioned between said upstream surface of said ring and said downstream surface of said ring, said nozzles comprising an inlet surface and an outlet surface;

a magneto hydrodynamic generator assembly coupled to said ring comprising a plurality of electrical conductive plates defining electrodes, coupled to said ring and said electrodes connected to an electrical circuit;

a cover coupled to said ring.

2. The fixed impeller ferfereh system in accordance with claim 1, further comprising:

a combustion chamber assembly coupled to said impeller upstream said flow channel comprising an inlet surface, an outlet surface.

3. The fixed impeller ferfereh system in accordance with claim 1, further comprising:

a compressor assembly coupled to said shaft;

a combustion chamber assembly coupled to said impeller upstream said flow channel comprising an inlet surface, an outlet surface;

a plurality of gas turbines, at least one stage of gas turbines coupled to said ring between said ring upstream surface and said nozzle inlet.

4. A fixed impeller ferfereh system comprising:

a casing defining a cavity extending between a fluid inlet and a fluid outlet;

a shaft positioned within said casing and defining a centerline axis, said shaft rotatably coupled to a rotary equipment;

a plurality of stationary vanes coupled to said casing, adjacent said vanes forming a pair and oriented such that a flow channel is defined between each said pair of adjacent vanes, said flow channel extending between an inlet opening and an outlet opening;

an impeller coupled to said vanes;

a combustion chamber assembly coupled to said impeller next to said flow channel comprising an inlet surface, an outlet surface and a plurality of stationary blades coupled to said impeller next to said combustion chamber;

a disk coupled to said shaft;

a ring coupled to said disk comprising an upstream surface and a downstream surface;

a plurality of nozzles that coupled to said ring between said upstream surface and said downstream surface of said ring, said nozzles comprising an inlet surface, an outlet surface;

a cover coupled to said ring.

5. The fixed impeller ferfereh system in accordance with claim 4, further comprising:

a plurality of stationary blades coupled to said impeller between said combustion chamber downstream surface and said ring upstream surface;

a plurality of gas turbines, at least one stage of gas turbines coupled to said ring between said ring upstream surface and said nozzle inlet.

6. The fixed impeller ferfereh system in accordance with claim 4, further comprising:

a conductive fluid;

a magnetic field;

a magneto hydrodynamic generator assembly coupled to said ring comprising a plurality of electrical conductive plates defining electrodes, coupled to said ring and said electrodes connected to an electrical circuit.

* * * * *